United States Patent
Guntermann et al.

(10) Patent No.: US 10,097,062 B2
(45) Date of Patent: Oct. 9, 2018

(54) ELECTRICAL IMPLEMENTATION UNIT HAVING A CONICAL CONTACT SURFACE ENGAGING A CONICAL BOREHOLE FORMED IN A HOUSING OF AN ELECTRICAL COMPONENT

(71) Applicant: Hanon Systems, Daejeon (KR)

(72) Inventors: Bernd Guntermann, Lennestadt (DE); Eric Rooks, Köln (DE); Bernadette Goebbels, Köln (DE)

(73) Assignee: HANON SYSTEMS, Daejeon (KR)

( * ) Notice: Subject to any disclaimer, the term of this patent is extended or adjusted under 35 U.S.C. 154(b) by 217 days.

(21) Appl. No.: 15/139,372

(22) Filed: Apr. 27, 2016

(65) Prior Publication Data
US 2017/0054342 A1    Feb. 23, 2017

(30) Foreign Application Priority Data

Mar. 3, 2015  (DE) .................. 10 2015 103 053

(51) Int. Cl.
*H02K 5/22*   (2006.01)
*H01B 17/30*  (2006.01)

(52) U.S. Cl.
CPC ........... *H02K 5/225* (2013.01); *H01B 17/301* (2013.01)

(58) Field of Classification Search
CPC ........ H02K 5/225; H02K 5/22; H02K 1/2786; H01B 17/301; H01B 17/303; H01B 17/305; H01B 17/306; H01B 17/308
(Continued)

(56) References Cited

U.S. PATENT DOCUMENTS 4,117,254 A * 9/1978 Richter .................. H01B 17/30
                                                            174/15.3
6,702,592 B1   3/2004 Harden et al.
(Continued)

FOREIGN PATENT DOCUMENTS

CN       201112587 Y    9/2008
DE          1013739 B    8/1957
(Continued)

*Primary Examiner* — Michael Andrews
(74) *Attorney, Agent, or Firm* — Shumaker, Loop & Kendrick, LLP; James D. Miller

(57) ABSTRACT

The invention relates to an electrical feed-through unit for penetration of electrical contacts through the wall of a housing of an electric motor. It has a pin made of an electrically conducting material, which is surrounded by an electrically insulating material. The pin possesses an at least partially wedge-shaped contact surface for the area of a penetration through the wall of the housing and is able to be arranged with the sheath surrounding it in an at least partially wedge-shaped borehole penetrating through the wall of the housing. In addition, the invention relates to a housing of an electric motor, which contains at least one such electrical feed-through unit as well as an electric motor which has such a housing.

What is advantageous with the design of an electric motor proposed here, is that, through savings in assembly time and assembly expense, as well as parts costs, it is possible to assemble the motor components in the motor housing very simply and favorably, and additionally a number of advantages are offered as compared to use of conventional glass-to-metal feed-through (GTMS). The openings in the motor housing required for the electrical feed-through units are small, resulting in improved pressure resistance and stiffness of the motor housing. The cross-sectional surface to be sealed is also small, and as a consequence, the rates of leakage and permeation are low.

11 Claims, 8 Drawing Sheets

(58) Field of Classification Search
USPC .... 310/71; 174/652–654, 665–669, 262–266
See application file for complete search history.

(56) References Cited

U.S. PATENT DOCUMENTS

| | | | | |
|---|---|---|---|---|
| 2005/0218733 | A1* | 10/2005 | Gandrud | ................ H02K 5/225 |
| | | | | 310/85 |
| 2008/0136274 | A1* | 6/2008 | Fujii | ........................ H02K 3/12 |
| | | | | 310/71 |
| 2011/0314933 | A1* | 12/2011 | Mueller | ................ B06B 1/0655 |
| | | | | 310/327 |

FOREIGN PATENT DOCUMENTS

| | | |
|---|---|---|
| DE | 3324466 A1 | 1/1985 |
| DE | 3909186 A1 | 9/1990 |
| DE | 102004031420 A1 | 2/2005 |
| DE | 102004030721 B3 | 10/2005 |
| DE | 102006041940 A1 | 3/2008 |
| DE | 102010043773 A1 | 8/2011 |
| JP | 2538682 | 4/1992 |
| JP | 2013240215 A | 11/2013 |

\* cited by examiner

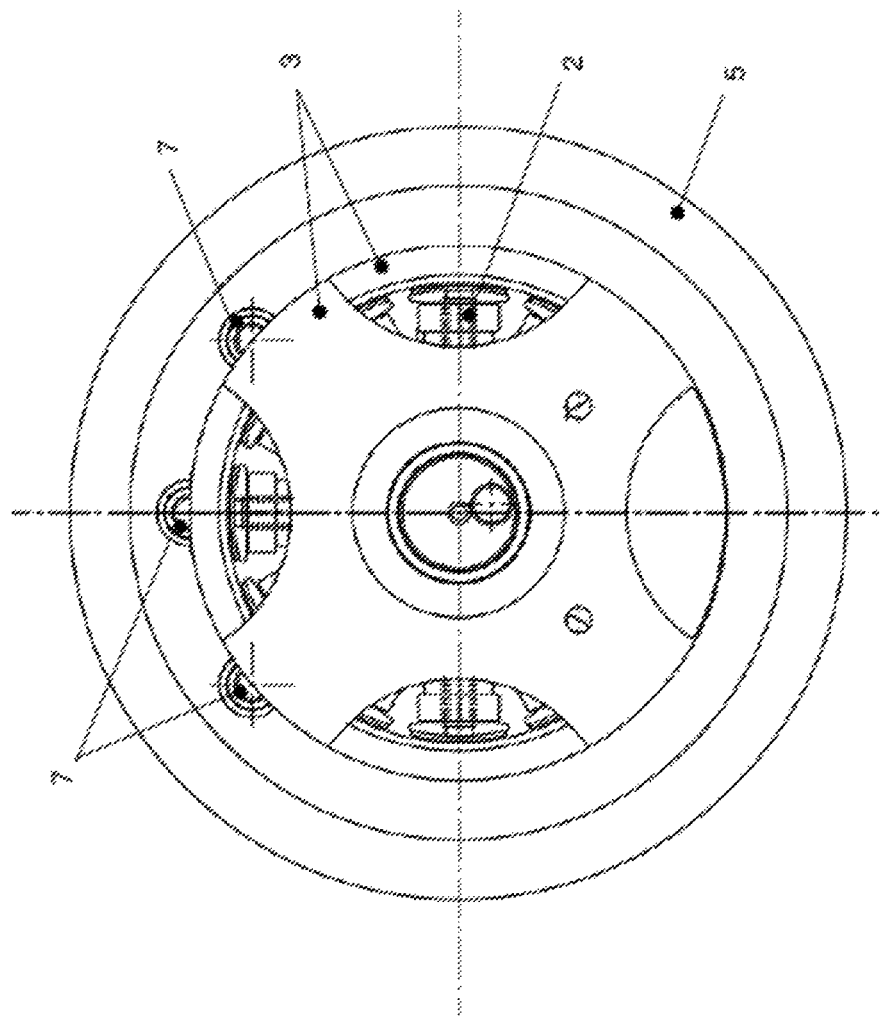
Fig. 2

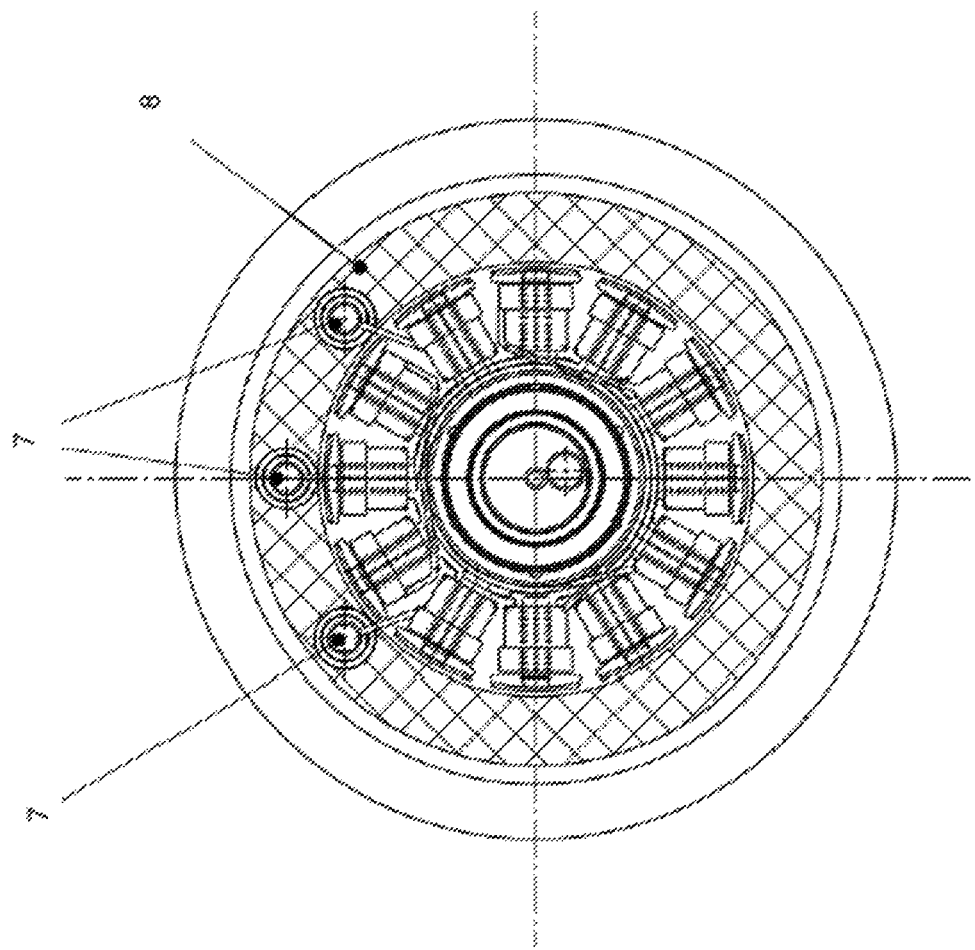
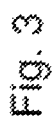

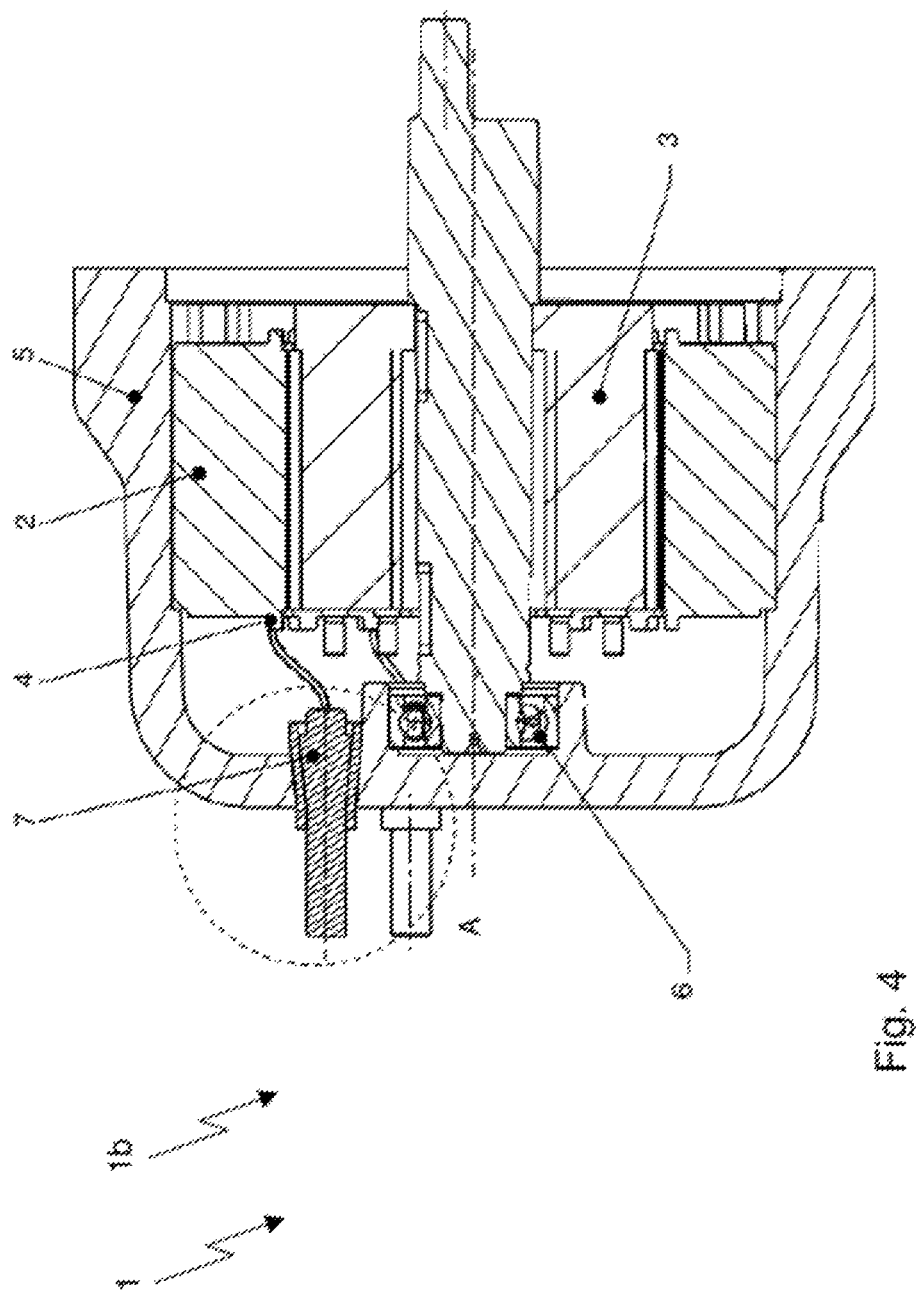

ELECTRICAL IMPLEMENTATION UNIT HAVING A CONICAL CONTACT SURFACE ENGAGING A CONICAL BOREHOLE FORMED IN A HOUSING OF AN ELECTRICAL COMPONENT

CROSS-REFERENCES TO RELATED APPLICATIONS

This application claims priority to German Patent Application No. 10 2015 103053.5, filed on Mar. 3, 2015, the disclosure of which is incorporated herein by reference in its entirety.

FIELD OF THE INVENTION

The invention relates to an electrical feed-through unit for feeding through of electrical contacts through the wall of a housing of an electric motor. The feed-through unit has a pin, which consists of an electrically-conducting material, and a sheath surrounding it. In addition the invention relates to the housing of an electric motor, which contains at least one such electrical feed-through unit, as well as an electric motor which has such a housing.

BACKGROUND OF THE INVENTION

Electrical motors for hermetical-sealing applications require a feed-through unit which directs electrical energy from the surroundings into the interior of a hermetically sealed motor housing. The feed-through unit must in this regard be sealed gas-tight in connection with the motor housing.

Various electrical feed-through units for hermetic sealing purposes are known. In DE 10 2010 043 773 B4, an electrical feed-through unit for hermetically-sealed compressors in refrigerant cycles is disclosed. The attachment pin and the elastic insulation material are under tension and lead through an opening of the housing of the hermetically-sealed compressor. The attachment pin and the insulating material are connected with each other by vulcanized joining.

In DE 33 24 466 A1, an electrical feed-through unit is disclosed for electric motors. Here, buds made of an insulating and elastic material admit the guiding pin. A bead made of insulating and elastic material provides resistance against the feed-through unit being pressed out of the housing.

DE 10 2006 041 940 A1 discloses an electrical feed-through unit for use in electrical therapy devices such as cardiac pacemakers. The electrical feed-through unit is hermetically sealed off by means of a filler. Here the filler is glass or glass ceramic, which ensures electrical insulation of the feed-through unit.

DE 39 09 186 A1 discloses another electrical feed-through unit for hermetical sealing applications. With this, an attachment line is secured in an active filler sheath, which is soldered in a borehole of the housing.

In practice, electrical feed-through units made of GTMS (glass-to-metal feed-through) are widely made use of. These consist of an outer steel body in which one or more glass bodies are smelted. A glass body, in turn, comprises the actual metallic, thus electrically conducting, pins, and the glass part electrically insulates the pin from the outer steel body.

The GTMS is attached on the motor housing, and requires either a separate seal and attachment material, or it is compressed into the motor housing, with the outer surface of the steel body forming a metallic seal with the motor housing. The arrangement is secured in the motor housing against becoming loose by, for example, a clip, and is hermetically sealed by an O ring, thus a ring-shaped sealing element. As a rule, the GTMS is incorporated before stator installation.

From a functional standpoint, i.e. as regards structural space, pressure impingement and pressure direction, it is desirable to install the stator and electrical feed-through unit into the motor housing in the same fitting direction. If the stator is already installed in the motor housing, only a limited freely-accessible area remains for installing the GTMS. In the case of an interior runner this is within the interior diameter of the stator, and in the case of an exterior runner, outside the stator exterior diameter.

However, as a rule, the GTMS requires more space for assembly. For this reason, electrical feed-through units are often placed outside the motor diameter, which requires additional room for the application and increases the overall structural space of the engine housing.

Alternatively, the assembly sequence can be changed, in that first the GTMS is attached in the housing, and then the stator is inserted. Then the feed-through unit lies behind the stator and no longer is freely accessible. This results in a difficult assembly operation or in a blind operations when the stator winding then makes contact with the GTMS.

A further disadvantage of the known GTMS are the large apertures required in the housing, which contribute to a weakening of the overall structure, which is especially relevant in high-pressure applications such as a carbon dioxide compressor.

Additionally, the difficult GTMS manufacturing process results in higher tolerances of electrically conducting pins. Along with that, the manufacturing process and also the later application places limits on choices for material of the current-carrying line to steel, which does not have good electrical properties. Lastly, due to brittleness of glass, GTMS is very sensitive to mechanical effects such as shear forces or torsion, which may appear during the assembly process.

The object of the invention is to provide an electrical motor that is particularly suited for hermetically-sealing, thus gas-tight, applications, and can from outside be supplied with the required electrical energy. An effort is also made to produce the electrical feed-through unit and to further install it in a more cost-efficient manner, and to make the feed-through unit design more flexible in positioning.

SUMMARY OF THE INVENTION

The object is attained by a subject with the features according to patent claim 1. Further developments are indicated in the subordinate patent claims.

The invention relates to an electrical feed-through unit for feeding through of electrical contacts through the wall of a housing of an electric motor. In other words, the electrical feed-through unit guides an electric conductor, thus a contact, through a housing. The electrical feed-through unit has a pin made of an electrically conducting material, which is surrounded by an electrically insulating sheath. According to the invention, the pin has a wedge-shaped contact surface for the area of penetration through the wall of the housing. With the sheath surrounding it, it is able to be arranged in a wedge-shaped borehole penetrating through the wall of the housing, i.e. it is possible to arrange the electrical feed-through unit in the wedge-shaped borehole.

According to the concept, the electrical feed-through unit consists of a pin, which consists of an electrically-conducting material. What is generally meant as a pin in terms of mechanical engineering is a cylindrically or wedge-shaped machine element which connects machine parts with each other. in the area in which the pin penetrates through the motor housing, the pin has an at least partially wedge-shaped contact surface. In other words, the diameter of the pin can be altered and increases on one side and does not decrease. In the area of penetration, the motor housing has a wedge-shaped borehole with a corresponding same-directional orientation, i.e., the diameter of the borehole likewise increases on one side and does not then decrease. An electrically insulating sheath is found between the pin and the wedge-shaped borehole.

It is especially advantageous that the at least partially wedge-shaped configuration of the sheath likewise matches the wedge shape of the pin.

In case there are pressure differences inside and outside the motor, there is a certain direction, in which the diameter of the conical borehole increases. The larger diameter of the conical surface is manifested into the interior of the motor housing in the case of a pressure-impinged system, or outward in the case of a vacuum.

Due to advantageous self-centering of the pins during the assembly process due to the wedge shape, narrow positional tolerances result, which has a positive effect on the quality of the assembly. Also an advantage is that, due to the compact design of the invention-specific electrical feed-through unit, the electrical feed-through unit can be easily accessible within the housing of an electric motor. Additionally, the electrical feed-through unit can be assembled independently of the assembly of the stator of the electric motor, resulting in assembly time being optimized. In other words, the electrical feed-through units and the stator of the electric motor can be inserted in the same assembly step, since the electrical feed-through units are easily accessible and not covered by the stator during the assembly process. Due to free accessibility, it is possible for stator windings to then make contact with the pins. It is also conceivable that the pins can be pre-assembled with the windings of the stator. An option is offered of combined assembly operation, requiring no subsequent assembly step.

The invention-specific electrical feed-through units can be used in a brushless d.c. motor, which is conceivable as an interior-runner configuration, the runner thus situated within the stator, or as an exterior runner configuration, with the rotor situated thus outside the stator. The compact design of the electrical feed-through units allows them to be placed in an easily accessible area between the motor bearing and the interior of the stator opening the case of interior-runner configuration, or outside the stator exterior diameter, but partially within the rotor exterior diameter, in the case of the exterior runner configuration. The electrical feed-through unit proposed here, in the case of the interior runner, can be placed very close to the motor bearing, due to its compact design.

The pin and the stator windings can preferably be made to contact by welding, soldering, screw connection, gluing, or numerous other methods, independent of the sequence chosen for assembly.

In one advantageous embodiment, Duromer is chosen as the material for the sheath. The Duromer sheath provides electrical insulation between the pin and motor housing. Thus, the insulation relative to the housing can be improved. Additionally, Duromer is much better able to counterbalance housing deformations of the electric motor by interior pressure and thermal expansions than conventional brittle glass feed-through units can, i.e., by this means, the mechanical robustness of the electrical feed-through units can be improved as compared to a traditional GTMS.

Since the attachment methods of lines to the motor and to the exterior are improved, selection of materials of the line connected with this is simplified. Since the electrical properties of copper are very favorable, preferably copper is chosen as the material for the electrically conducting pin thus for the current-carrying line of the electrical feed-through unit.

As compared to steel, copper has less electrical resistance, and, linked therewith, less energy loss. For this reason, the electrical conductivity of lines can be improved by use of copper. Additionally, copper possesses better possibilities for attachment. Conceivable, for example, is a fly lead connection to the stator, which is capable of counterbalancing positional tolerances. Also, other materials with good electrical conductivity, especially other noble metals or alloys of them, are suited to be used in an advantageous embodiment as a material for the pin. Brass is preferably used as an alloy containing copper.

The electrical feed-through unit is preferably configured in a single-piece or two-piece version. In other words, the pin and the sheath preferably are either connected or they remain separated and are combined during assembly. In the one-piece version, the sheath made of insulating material is preferably extrusion-coated around the pin, while in the two-piece version, the sheath is slid over the electrically conducting pin as a separate piece. The pin and sheath then form a two-piece arrangement.

The invention in addition relates to a housing of an electric motor, which contains at least one invention-specific electrical feed-through unit and at least one wedge-shaped borehole penetrating through a wall of the housing, in which the feed-through unit is arranged.

Preferably the pin of the electrical feed-through unit is attached by press bonding with the sheath surrounding it in the wedge-shaped borehole of the housing.

A pressure difference is preferably induced between the two sides of the wall of the housing, through which the electrical feed-through unit runs, which secures the wedge-shaped pin and the sheath surrounding it within the wedge-shaped borehole.

In one especially advantageous embodiment, the wedge-shaped pin, in connection with the sheath surrounding it, hermetically seals the housing of the electric motor, i.e., in gas-tight fashion.

According to the design, the sealing of the arrangement arises through pressing of the wedge-shaped pin into the wedge borehole of the motor housing. By this means, a high surface pressing is generated between the three participating components. The wedge angle is dimensioned so that there arises a self-locking pressed connection, which requires or generates high mandatory pressing forces. Thus, the pressure difference that appears during operation between the motor housing and its surroundings has a positive effect on the pressed connection. A very compact form of the electrical feed-through unit can be attained, which ends up with no additional seals or attachment means.

In addition, the invention relates to an electric motor with a rotor and a stator, with the motor having a housing as described above, which contains at least one invention-specific electrical feed-through unit. The stator and the rotor of the electric motor are within the housing.

In a preferred version, the electric motor is designed as an interior-miner configuration. With an interior-runner configuration, the rotor is within the stator. In this version, the electrical feed-through unit or units are situated within the interior diameter of the stator, and there are accessible through a stator opening, i.e. through an interior stator opening.

An exterior runner configuration represents an alternative advantageous embodiment. In other words, the stator is within the rotor. The rotor surrounds the stator. With this, the electrical feed-through unit or units are situated outside the stator diameter, where they are accessible for assembly or for contacting.

What is advantageous with the design of an electric motor proposed here, is that, through savings in assembly time and assembly expense, as well as pails costs, it is possible to assemble the motor components in the motor housing very simply and favorably, and additionally a number of advantages are offered as compared to use of conventional glass-to-metal feed-through (GTMS). The openings in the motor housing required for the electrical feed-through units are small, resulting in improved pressure resistance and stiffness of the motor housing. The cross-sectional surface to be sealed is also small, and as a consequence, the rates of leakage and permeation are low.

Due to simplified application and low price, the concept can also be of interest for semi-hermetic or non-hermetic applications. If the thermal and pressure requirements are low, Duromer can be replaced by a thermoplastic or elastomer.

The corresponding applications for the concept are numerous. Applications in automotive engineering, for example in AC compressors, oil, water and gasoline pumps, and in hydraulic devices as well as servocontrols or ABS pumps, as well as in numerous other applications, which have nothing to do with automobiles, are conceivable.

BRIEF DESCRIPTION OF THE DRAWINGS

Further particulars, features and advantages of embodiments of the invention are derived from the following specification of embodiment examples with reference to the pertinent drawings. Shown are:

FIG. 2: Rear view of an electrical exterior runner motor for hermetically sealed applications with installed electrical feed-through unit FIG. 3: Rear view of the electrical exterior runner motor without the rotor FIG. 4: Side view of an electrical interior runner motor for hermetically sealed applications with installed electrical feed-through unit

DETAILED DESCRIPTION OF THE INVENTION

Figure 1:
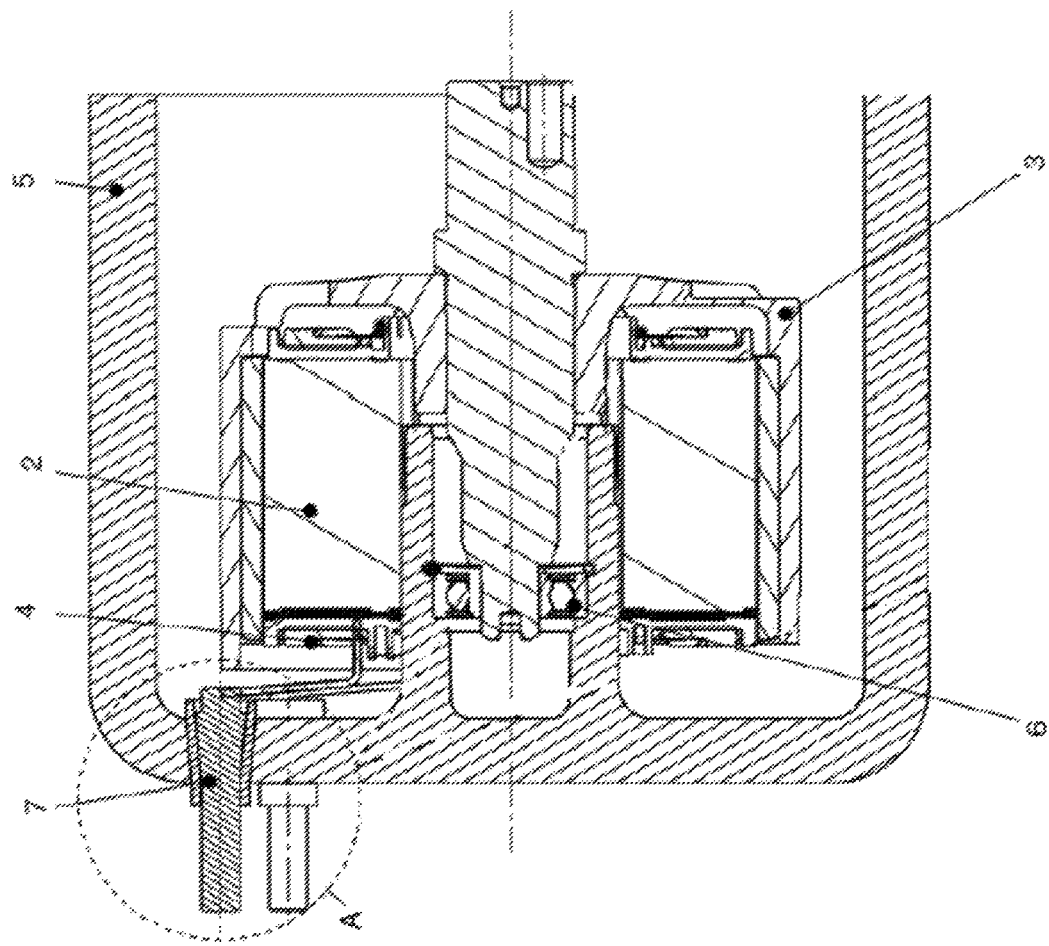
FIG. 1: Side view of an electrical exterior runner motor for hermetically sealed applications with installed electrical feed-through unit

FIG. 1 shows a brushless electric motor 1. Here in the version of an exterior runner motor 1a. Here the stator 2 is located within the rotor 3, which surrounds the stator. The electrical control device is attached to the stator windings 4. This exterior runner motor 1a is suitable for hermetically sealed applications and is surrounded by a gas-tight housing 5. The motor bearing 6 is also situated within the stator 2. For contacting the electric motor 1 externally, on housing 5, an electrical feed-through unit 7 is situated. The electrical feed-through unit 7 is inserted with a wedge shape into housing 5. The section A indicates the area of electrical feed-through unit 7 in housing 5.

FIG. 2 shows a rear view of the exterior runner motor 1a from FIG. 1. The elements of stator 2 are partially covered by the rotor. Also the electrical feed-through units 7 are only perceived in a partial fashion. The motor 1 is in a hermetically sealed housing 5.

FIG. 3 shows the arrangement from FIG. 2, with the rotor 3 not depicted here. By this means, the electrical feed-through units 7 are able to be seen here very well. The crosshatched area 8 represents the area of motor housing 5 which is particularly well suited for electrical feed-through units. The area 8 of motor housing 5 that is particularly well suited for electrical feed-through units is limited, in an exterior runner motor 1a, to the area outside the exterior stator diameter.

Similar to FIG. 1, FIG. 4 represents an interior runner motor 1b. Here also, the individual components of motor 1 are arranged within housing 5. However, here the stator 2 lies outside rotor 3. Thus, rotor 3 runs within stator 2 here. The arrangement of stator winding 4 and motor bearing 6 is altered here compared to exterior runner motor 1a. The electrical feed-through unit 7 is shown within section A.

Figure 5:
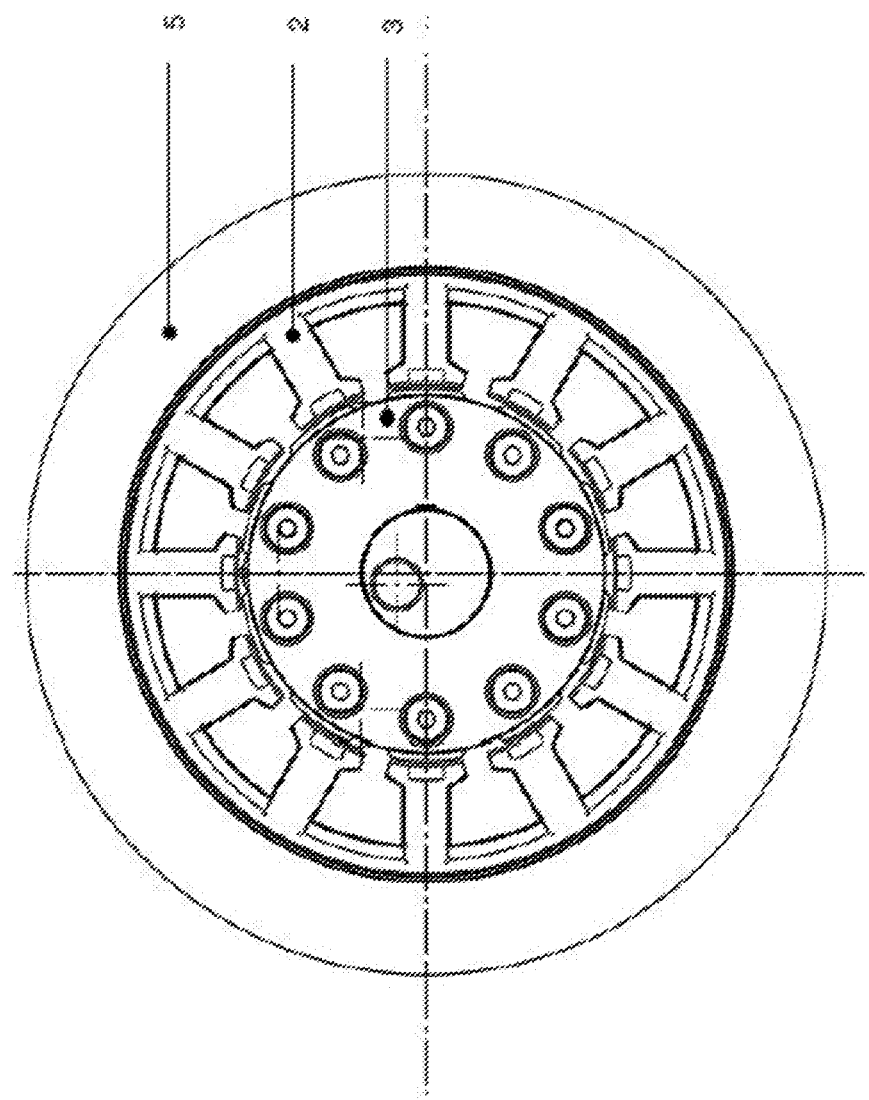
FIG. 5: Rear view of an electrical interior runner motor for hermetically sealed applications with installed electrical feed-through unit

FIG. 5 depicts a rear view of interior runner motor 1b. The stator 2 is positioned outside rotor 3. The components are arranged within housing 5. Since they are covered by rotor 3, the electrical feed-through units 7 cannot be seen.

Figure 6:
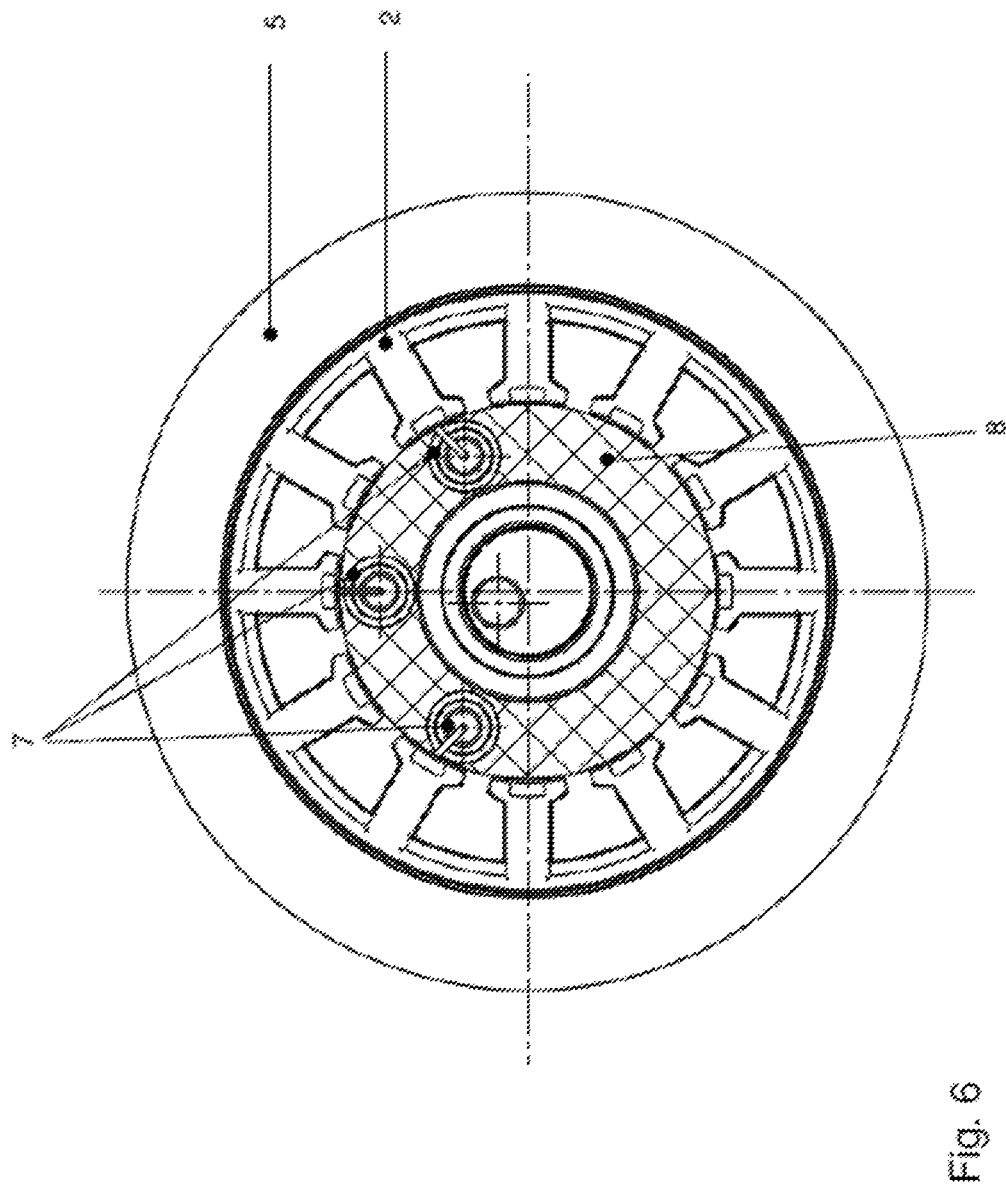
FIG. 6: Rear view of the electrical interior runner motor without the rotor

FIG. 6 shows a rear view of the interior runner motor 1b without the rotor 3. The elements of stator 2, as also the crosshatched area 8 suitable for electrical feed-through devices, are arranged within housing 5. This area 8 is limited in an interior runner motor 1b to the area within the inner stator diameter.

Figure 7:
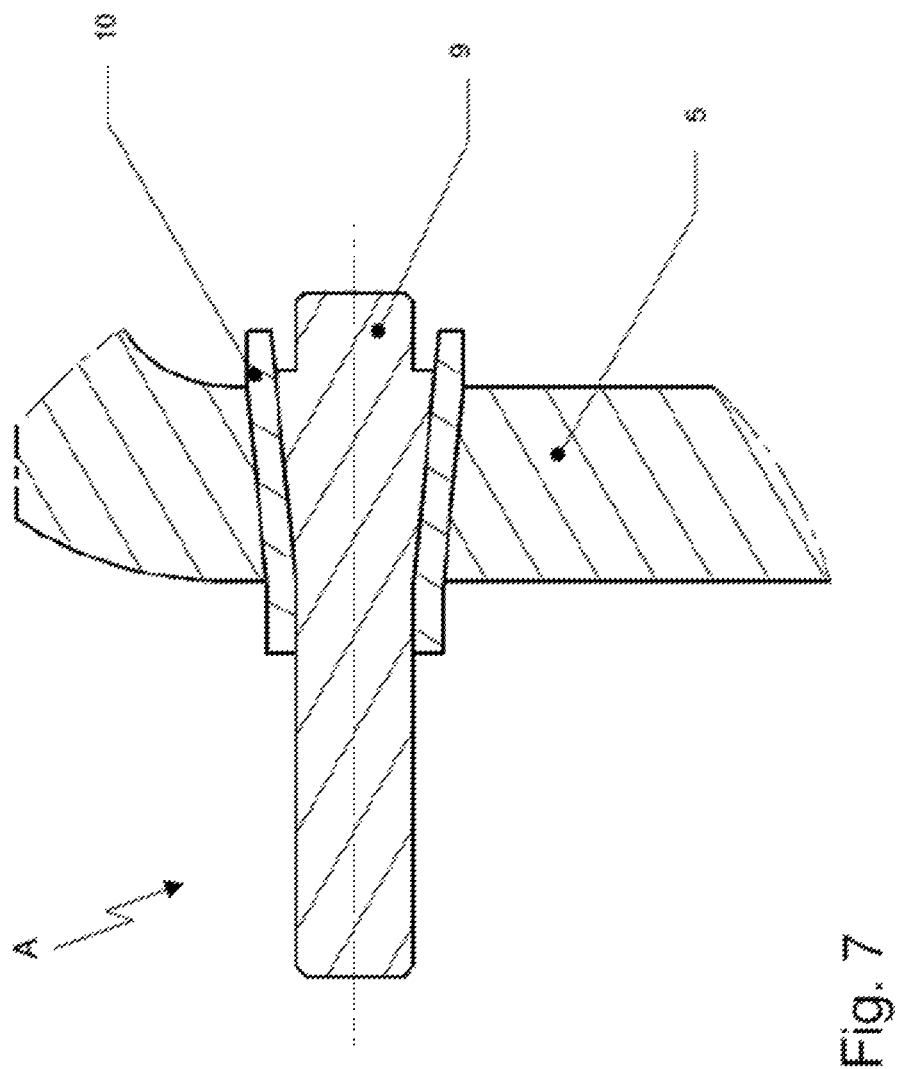
FIG. 7: Electrical feed-through unit in housing

FIG. 7 shows the section A from FIGS. 1 and 4. The electrical feed-through unit 7 consists of an electrically conducting pin 9 and a sheath 10 consisting of Duromer. The electrical feed-through unit 7 is secured in housing 5 by press bonding. The forces which appear due to the wedge-shaped contact surface of pin 9 and sheath 10 Ex feed-through unit 7 in housing 5.

Figure 8:
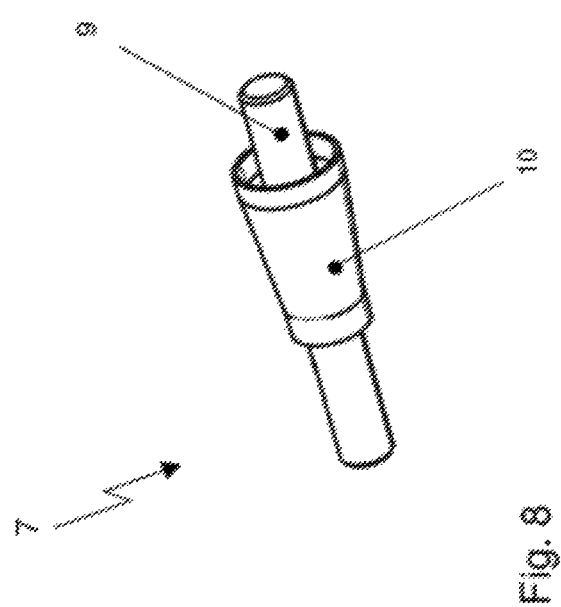
FIG. 8: One-piece electrical feed-through unit

FIG. 8 shows a one-piece version of electrical feed-through unit 7. The sheath 10 and metal pin 9 are firmly attached. Metal pin 9 was extrusion-coated with insulating material.

Figure 9:
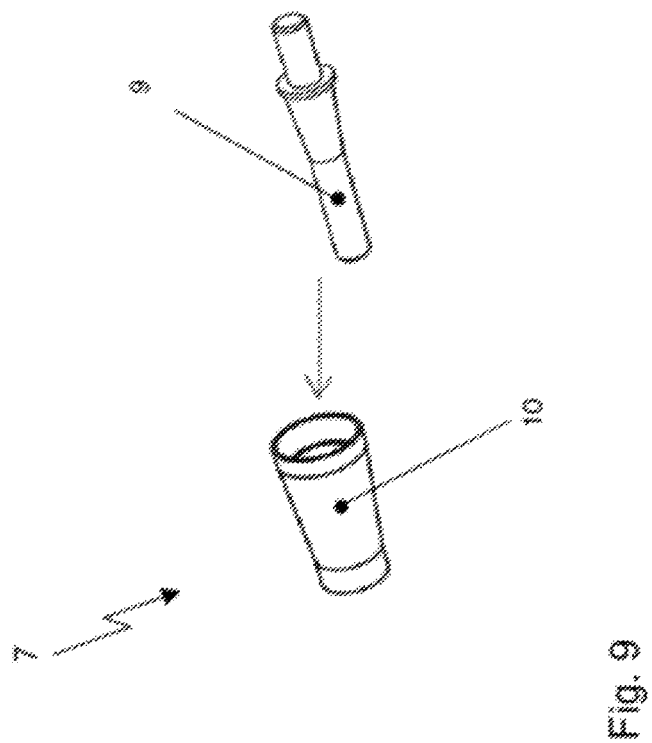
FIG. 9: Two-piece electrical feed-through unit

FIG. 9 depicts a two-piece version of electrical feed-through unit 7. The sheath 10 made of insulating material is slid over metal pin 9 here.

LIST OF REFERENCE SYMBOLS

1 Electric motor
1a Exterior runner motor
1b Interior runner motor
2 Stator
3 Rotor
4 Stator winding, stator windings
5 Motor housing, housing
6 Motor bearing
7 Electrical feed-through unit A Section of image that shows the electrical feed-through unit
8 Area of the motor housing which is particularly suited for electrical feed-through units
9 Metal pin, pin, wedge-shaped pin
10 sheath, wedge-shaped sheath, insulating material
Interior runner motor

The invention claimed is:

1. An electrical device comprising:
    a housing (5) having a wall with a borehole formed therein, wherein an entirety of the borehole is conical in shape;
    an electrical feed-through unit (7) for penetration of electrical contacts through the wall of the housing (5), the electrical feed-through unit (7) having a pin (9) made of an electrically conducting material surrounded by an electrically insulating sheath (10), the pin (9) including a contact surface contacting the sheath (10), wherein the electrical feed-through unit (7) is arranged with the sheath (10) surrounding the pin (9) within the borehole, characterized in that an entirety of the contact surface of the pin (9) disposed within the borehole is conical in shape.

2. The electrical device of claim 1, characterized in that an entirety of a portion of the sheath (10) disposed in the borehole and engaging the contact surface of the pin (9) is conical in shape.

3. The electrical device of claim 1, characterized in that the sheath (10) consists of Duromer.

4. The electrical device of claim 1, characterized in that the electrically conducting pin (9) consists of a noble metal or alloy thereof.

5. The electrical device of claim 1, characterized in that the pin (9) and the sheath (10) form an integral electrical feed-through unit (7).

6. The electrical device of claim 1, characterized in that the pin (9) and the sheath (10) form a two-piece electrical feed-through unit (7).

7. The electrical device of claim 1, characterized in that the pin (9) of the electrical feed-through unit (7) is attached by press bonding with the sheath (10) surrounding the pin (9) in the borehole of the housing (5).

8. The electrical device of claim 1, characterized in that a pressure difference between the two sides of the wall of the housing (5), through which the electrical feed-through unit (7) penetrates, fixes the pin (9) and the sheath (10) surrounding the pin (9) within the borehole.

9. The electrical device of claim 1, characterized in that the pin (9) in connection with the sheath (10) surrounding the pin (9) hermetically seals the housing (5) of the electric device, i.e. in gas-tight fashion.

10. The electric device of claim 1, wherein the electrical device is an electric motor (1, 1a, 1b), characterized in that the electric motor (1, 1a, 1b) has an interior runner configuration, in which a rotor (3) is situated within a stator (2), wherein the electrical feed-through unit (7) is able to be accessed through an inner stator opening for assembly and/or for contacting.

11. The electric device of claim 1, wherein the electrical device is an electric motor (1, 1a, 1b), characterized in that the electric motor (1, 1a, 1b) has an exterior runner configuration, in which a stator (2) is situated within a rotor (3) and the rotor (3) surrounds the stator (2), wherein the at least one electrical feed-through unit (7) is accessible outside a diameter of the stator for assembly and/or contacting.

* * * * *